US006848442B2

(12) United States Patent
Haber

(10) Patent No.: US 6,848,442 B2
(45) Date of Patent: Feb. 1, 2005

(54) SOLAR PANEL TILT MECHANISM

(76) Inventor: Michael B. Haber, 7 Boonah Street, Wentworthville, NSW 2145 (AU)

( * ) Notice: Subject to any disclaimer, the term of this patent is extended or adjusted under 35 U.S.C. 154(b) by 0 days.

(21) Appl. No.: 10/182,430

(22) PCT Filed: Jan. 29, 2001

(86) PCT No.: PCT/AU01/00074

§ 371 (c)(1),
(2), (4) Date: Mar. 3, 2003

(87) PCT Pub. No.: WO01/55651

PCT Pub. Date: Aug. 2, 2001

(65) Prior Publication Data

US 2003/0172922 A1 Sep. 18, 2003

(30) Foreign Application Priority Data

Jan. 27, 2000 (AU) .............................. PQ 5258
Jan. 27, 2000 (AU) .............................. PQ 5259
Aug. 15, 2000 (AU) .............................. PQ 9370

(51) Int. Cl.[7] ................................................ F24J 2/38
(52) U.S. Cl. ........................................ 126/600; 126/607
(58) Field of Search ................................ 126/600, 607, 126/570

(56) References Cited

U.S. PATENT DOCUMENTS

| 4,187,123 A | * | 2/1980 | Diggs .......................... 136/206 |
| 4,365,617 A | * | 12/1982 | Bugash et al. ............... 126/578 |
| 4,404,465 A | | 9/1983 | Miller |
| 4,586,488 A | | 5/1986 | Noto |
| 4,883,340 A | | 11/1989 | Dominguez |
| 4,995,377 A | | 2/1991 | Eiden |
| 6,079,408 A | | 6/2000 | Fukuda |

FOREIGN PATENT DOCUMENTS

| DE | 04329805 | * | 4/1995 |
| GB | 2 234 723 | | 2/1991 |
| JP | 2001035503 | * | 2/2001 |
| WO | WO 98/21089 | | 5/1998 |

* cited by examiner

Primary Examiner—Alfred Basichas
(74) Attorney, Agent, or Firm—Knobbe, Martens, Olson & Bear, LLP

(57) ABSTRACT

A tilt mechanism associated with a solar panel assembly whereby effort required to tilt panel assemblies comprising the solar panel assembly is reduced or minimized by appropriate placement of first and second tilt axes with respect to the center of mass and/or center of pressure of the panel assemblies due to wind. These arrays are suitable for use on mobile or static installations. The tilt mechanism is suited for harnessing wind energy if the panels are suitably shaped.

2 Claims, 6 Drawing Sheets

Fig 1.1a - Horizontal

Fig 1.2a - Forward at 45 deg

Fig 1.3a - Forward & Side 45deg

Fig 1.4a - Side only at 45deg

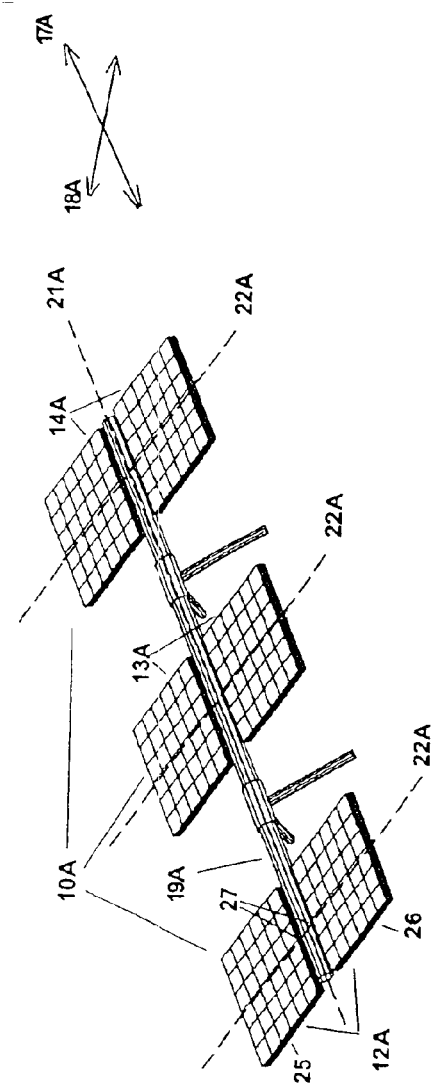
FIG 1B
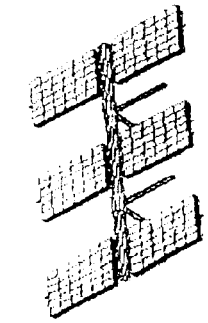
Fig 1.1b - Horizontal
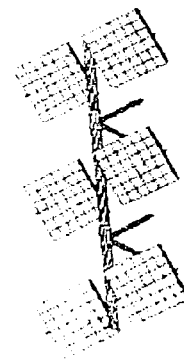
Fig 1.2b - Forward at 45 deg
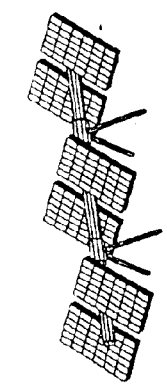
Fig 1.3b - Forward & Side 45deg
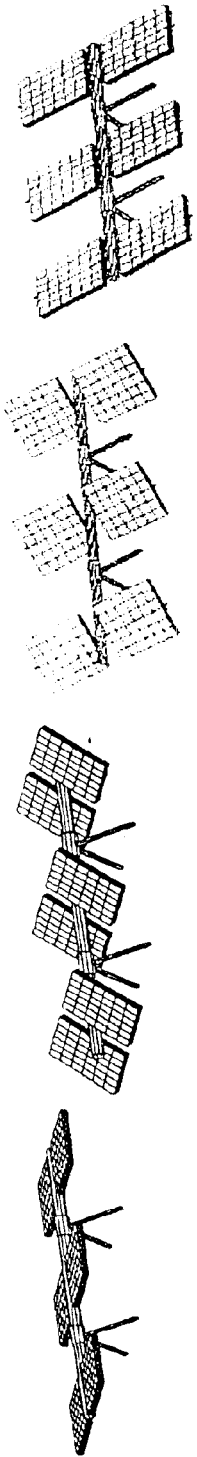
Fig 1.4b - Side only at 45deg

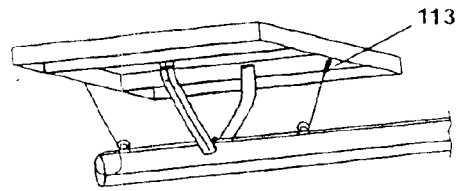
FIG 2.4
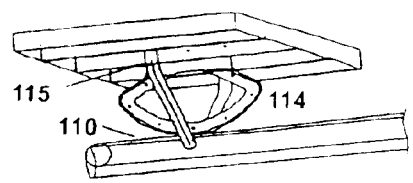
FIG 2.5
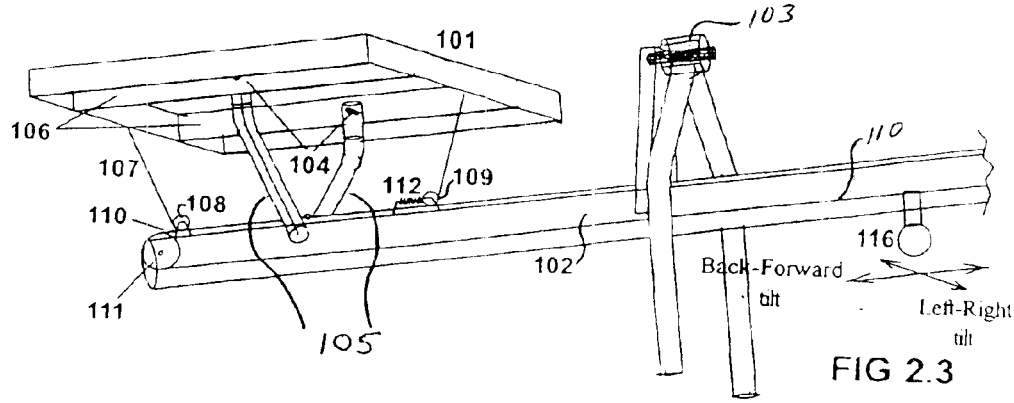
FIG 2.3
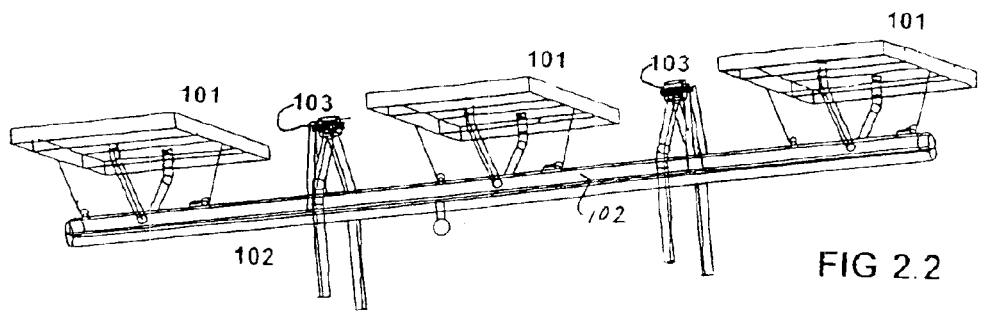
FIG 2.2
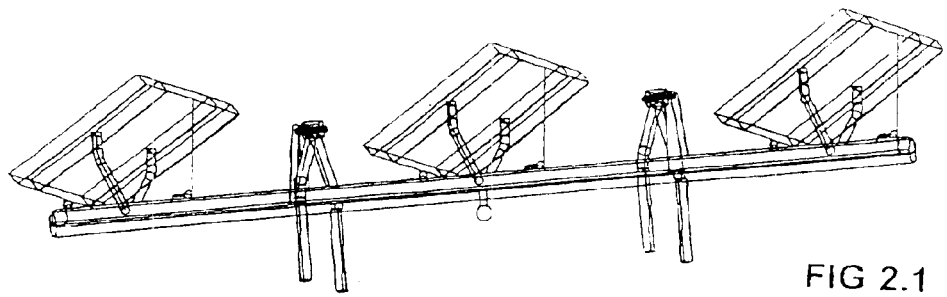
FIG 2.1

FIG 3.1
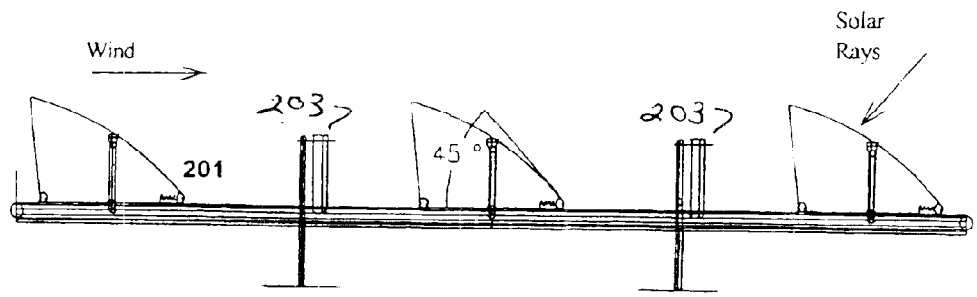
FIG 3.2
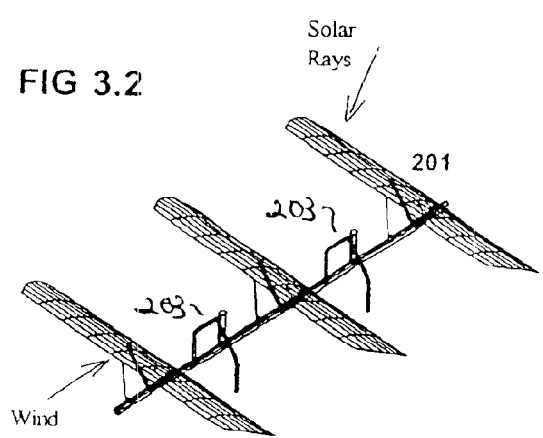
FIG 3.3
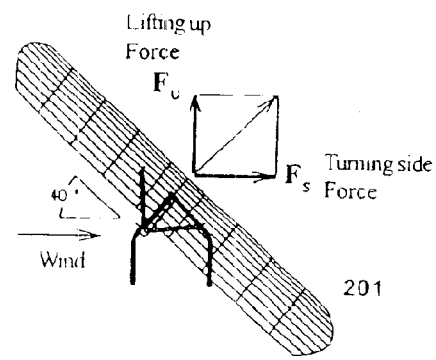
FIG 3.4
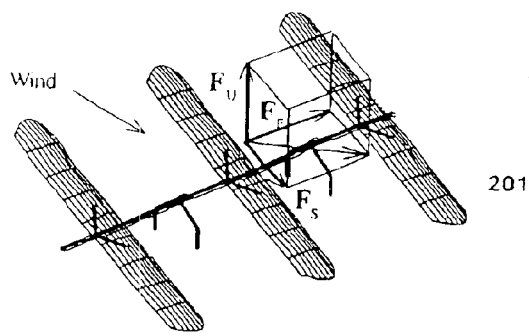
FIG 3.5
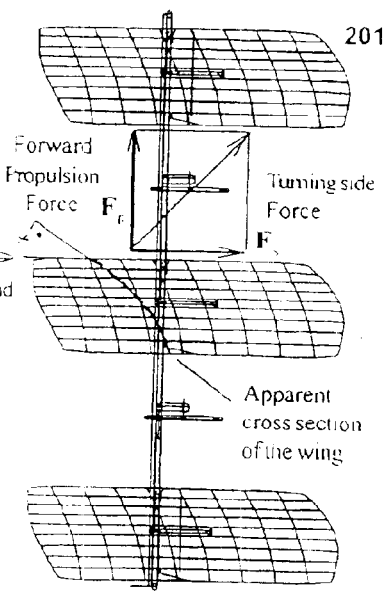

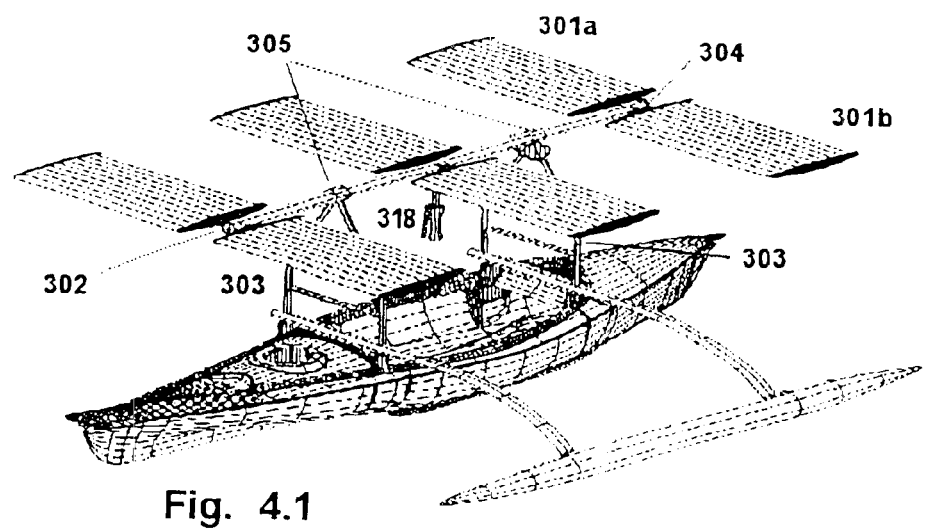
Fig. 4.1
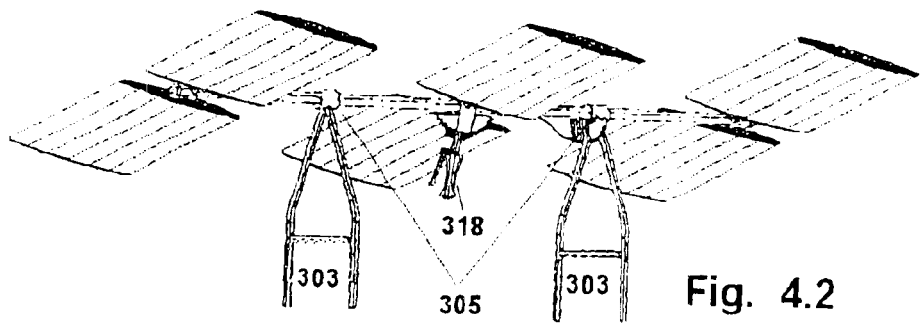
Fig. 4.2
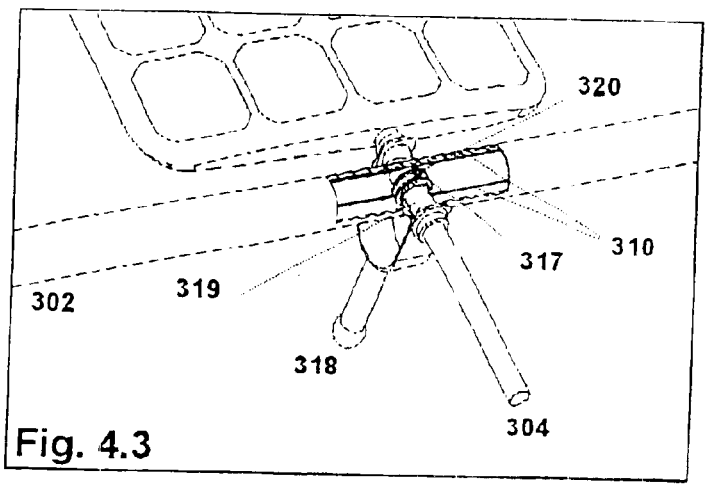
Fig. 4.3

Fig. 4.4
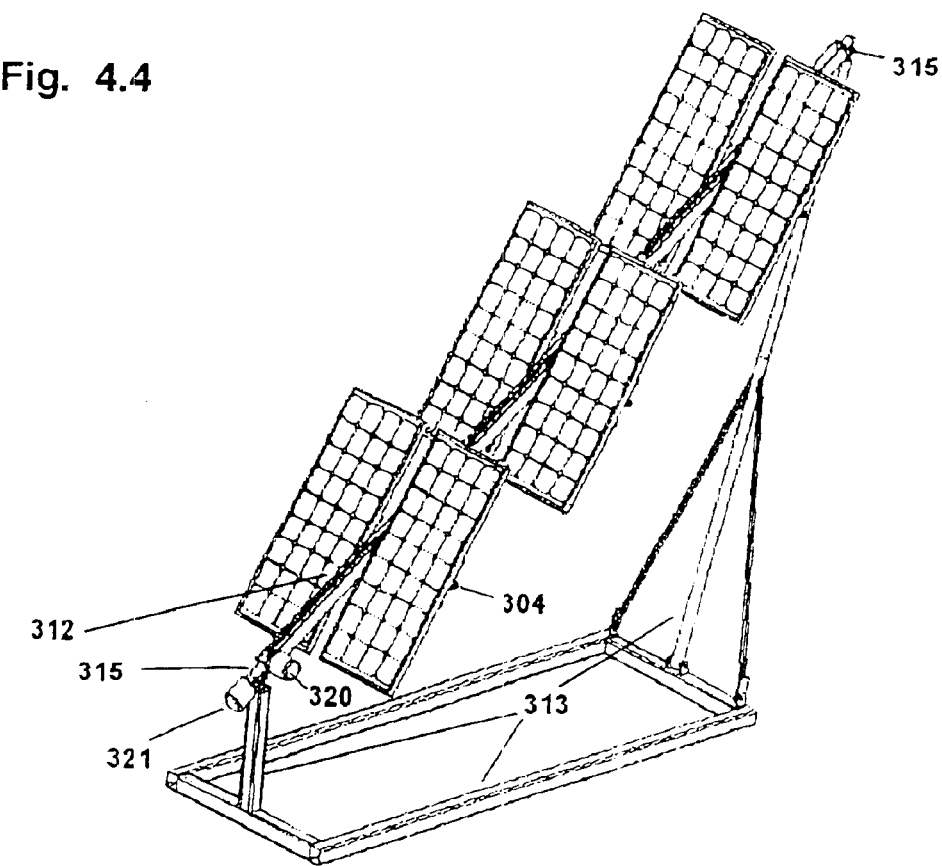
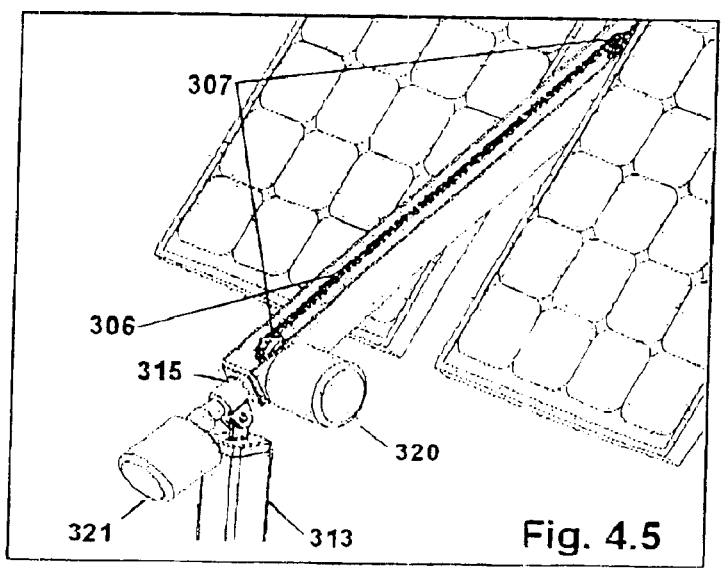
Fig. 4.5

SOLAR PANEL TILT MECHANISM

RELATED APPLICATIONS

This application is a national phase application in the United States of the international application PCT/AU01/00074 filed Jan. 29, 2001 and claims the benefit of the Australian application PQ5258 and PQ5259 filed Jan. 27, 2000 and PQ9370 filed Aug. 15, 2000.

The present invention relates to a solar panel tilt mechanism and, more particularly, to such a mechanism adapted for use with an array of solar panels

BACKGROUND

Nowadays solar cells are finding application in many fields of endeavour because the power output per unit weight and per unit cost has been steadily increasing.

Nonetheless, it is still the case that a relatively large solar collection area is required to obtain sufficient power output for many applications.

Array area can be minimized for a given power output if it is possible to tilt the array in at least one dimension and, more preferably, in two dimensions so that the array tracks the sun with the aim being to maximize the amount of time that solar radiation is incident perpendicular to the plane of the solar cells making up any given array.

Particularly where each array becomes itself large in area the complexity and hence cost of tilting mechanisms can begin to work against the economics of adopting a sun tracking mechanism.

In marine applications where solar cell arrays are mounted on boats, yachts and ships or the like even more pressure is placed on these considerations.

It is an object of the present invention to overcome or ameliorate one or more of the above mentioned disadvantages.

BRIEF DESCRIPTION OF INVENTION

Accordingly, in one broad form of the invention there is provided a solar panel tilt mechanism for an array of solar panel assemblies; said mechanism adapted to take account of solar and wind conditions and further adapted to tilt in unison all panel assemblies forming said array of solar panels assemblies; said tilt mechanism incorporating individual panel tilt means associated with each individual panel assembly of said array of panels; said individual tilt means supporting each said individual panel assembly with which it is associated about at least a first tilt axis; all of said first tilt axes aligned along a common first tilt axis; said common first tilt axis aligned whereby the centre of mass of the array of solar panel assemblies lies along or near said common first tilt axis; whereby effort required to tilt said array about said common first tilt axis is minimized.

Preferably said individual tilt means further supports each said individual panel assembly for tilting about a second tilt axis; said second tilt axis aligned whereby the centre of mass of each said individual panel assembly lies along or near said second tilt axis.

Preferably said first tilt axis lies substantially at right angles to said second tilt axis.

In yet a further broad form of the invention there is provided a solar panel tilt mechanism for an array of solar panel assemblies; said mechanism adapted to take account of solar and wind conditions and further adapted to tilt in unison all panel assemblies forming said array of solar panels assemblies; said tilt mechanism incorporating individual panel tilt means associated with each individual panel assembly of said array of panels; said individual tilt means supporting each said individual panel assembly with which it is associated about at least a first tilt axis; all of said first tilt axes aligned along a common first tilt axis; said common first tilt axis aligned whereby the centre of pressure of the array of solar panel assemblies lies along or near said common first tilt axis; whereby effort required under wind load to tilt said array about said common first tilt axis is minimized.

Preferably said individual tilt means further supports each said individual panel assembly for tilting about a second tilt axis; said second tilt axis aligned whereby the centre of pressure of each said individual panel assembly lies along or near said second tilt axis.

Preferably said first tilt axis lies substantially at right angles to said second tilt axis.

In yet a further broad form of the invention there is provided a solar panel tilt mechanism for an array of solar panel assemblies; said mechanism adapted to take account of solar and wind conditions and further adapted to tilt in unison all panel assemblies forming said array of solar panels assemblies; said tilt mechanism incorporating individual panel tilt means associated with each individual panel assembly of said array of panels; said individual tilt means supporting each said individual panel assembly with which it is associated for tilting about a first tilt axis and a second tilt axis, said first tilt axis oriented substantially at right angles to said second tilt axis Preferably said first tilt axes are aligned along a common first tilt axis.

Preferably said common first tilt axis is aligned hereby the centre of mass of said array of individual panel assemblies lies along or near said common first tilt axis; whereby effort required to tilt said array of panel assemblies about said common first tilt axis is minimized.

Preferably said individual tilt means further supports each said individual panel for tilting about a second tilt axis; said second tilt axis aligned whereby the centre of mass of each said individual panel assembly lies along or near said second tilt axis.

Preferably said first tilt axis lies substantially at right angles to said second tilt axis.

Preferably said first tilt axis lies substantially in a horizontal plane

Refer to the Claims and the Detailed Description for further features of the invention.

BRIEF DESCRIPTION OF DRAWINGS

Embodiments of the present invention will now be described with reference to the accompanying drawings wherein

FIGS. 1.1*a* through to FIG. 1.4*a* are further perspective views of the array and tilt mechanism of FIG. 1A with the tilt mechanism in different operational positions;

FIG. 1B is a perspective view of a solar panel array and tilt mechanism according to a second preferred embodiment of the present invention;

FIGS. 1.1*b* through to FIGS. 1.4*b* are perspective views of the solar panel assembly and tilt mechanism of FIG. 1B with the tilt mechanism in different positions:

FIG. 2.1 is a perspective view of a solar panel array with tilt mechanism illustrating further detail according to the first preferred embodiment;

FIG. 2.2 is a further perspective view of the array and tilt mechanism of FIG. 2.1;

FIG. 2.3 is a detailed perspective view of a solar panel of the arrangement of FIG. 2.1;

FIG. 2.4 illustrates a perspective view of an 15 alternative arrangement for the tilt mechanism of FIG. 1;

FIG. 2.5 is a perspective view of a further alternative tilt arrangement for the mechanism of FIG. 2.1;

FIG. 3.1 is a side view of a profiled solar panel array with tilt mechanism according to a third preferred embodiment of the invention;

FIG 3.2 is a perspective view of the array and tilt mechanism of FIG. 3.1;

FIG. 3.3 is a perspective view of an individual profiled panel of the array and tilt mechanism of FIG. 3.1;

FIG. 3.4 is a further perspective view of the array and tilt mechanism of FIG. 3.2 illustrating reaction to particular wind forces;

FIG. 3.5 is a further perspective view of the array and tilt mechanism of FIG. 3.2 illustrating alternative wind force behaviour;

FIG. 4.1 is a perspective view of further detail of the second embodiment of an array and tilt mechanism applied in a marine application to a kayak with outrigger;

FIG. 4.2 is a detailed perspective view of the array FIG. 4.1.

FIG. 4.3 is a detailed, cutaway view of part of the support structure for the array of FIG. 4.1;

FIG. 4.4 is a perspective view of the second embodiment of a solar panel array and tilt mechanism applied to a stationary application;

FIG. 4.5 is a perspective view of part of the array and tilt mechanism of FIG. 4.4 showing additional detail.

DETAILED DESCRIPTION OF PREFERRED EMBODIMENTS

Figure 1A:
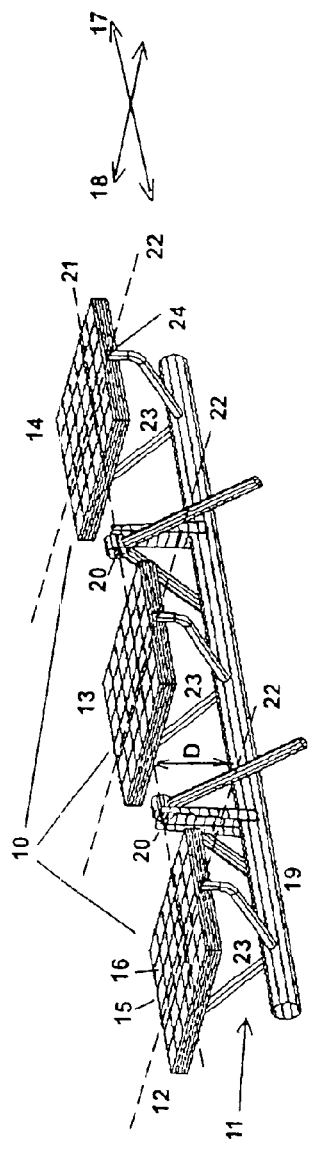
FIG. 1A is a perspective view of a solar panel array with tilt mechanism according to a first embodiment of the present invention.
Figure 1A:
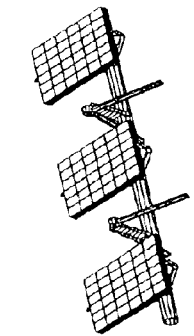
Figure 1A:
Figure 1A:
Figure 1A:
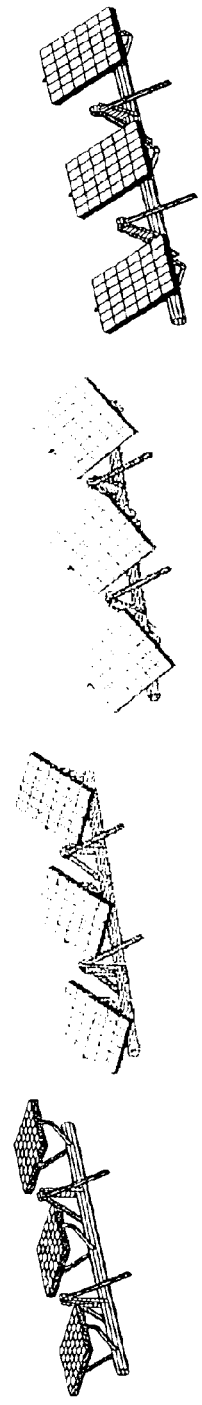

Initially, with reference to FIG. 1A there is illustrated a solar panel array 10 incorporating a tilt mechanism 11 according to a first preferred embodiment of the present invention.

In this instance the solar panel array 10 comprises an array of three panel assemblies 12, 13, 14. In this instance each panel assembly comprises a substantially flat panel is with an array of solar cells 16 mounted on the top thereof under a protective layer and facing in an upward direction relative to the solar panel assembly 10.

The tilt mechanism 11 supports all of the panel assemblies 12, 13, 14 in a manner; which permits their tilting in unison about, in this instance, a first tilt axis 17 and a second tilt axis 19. In this instance the first tilt axis 17 is aligned with the longitudinal axis of primary support member 19 but, by virtue of support points 20, is displaced from the axis of primary support member 19 a vertical distance D thereby placing first tilt axis 17 aligned substantially, in this instance, with the longitudinal centre line 21 of each and every one of the panel assemblies 12, 13, 14.

In this instance second tilt axis 18 is aligned with the cross centre line 22 of each and every one of the panel assemblies 12, 13, 14 by means of pivot brackets 23 which extend upwardly from primary support member 19 in a predominantly V formation and are pivotally attached at opposed edge portions of panel assemblies 12, 13, 14 at pivot points 24.

With appropriate rotation of primary support member 19 about support points 20 each panel assembly 12, 13, 14 can be tilted about first tilt axis 17.

With appropriate rotation of panel assemblies 12, 13, 14 about cross centre line 22 by way of pivot points 24, each and every one of the panel assemblies 12, 13, 14 can be tilted about second individual tilt axis 18a of each panel.

Because first tilt axis 17 and second tilt axis 18 are at right angles to each other it is possible for each panel assembly 12, 13, 14 to adopt any of the angular positions as, for example, shown in FIGS. 1.1A through to FIGS. 1.4A comprising respectively a horizontal position, a forward at 45° position, a forward and side 45° position and a side only at 45° position together with all positions in between.

FIG. 1B illustrates a solar panel array 10A with tilt mechanism 11A according to a second embodiment of the present invention. In this instance like components are numbered as for the first embodiment of FIG. 1A, except suffixed with the letter A.

The substantive difference as between the array of FIG. 1A is that, in this instance, each panel assembly 12A, 13A, 14A comprises a panel pair comprising first panel 25 and second panel 26 mounted symmetrically about primary support member 19A. Also, in this instance, primary support member 19A is aligned with the longitudinal centre line 21 of the panel assemblies 12A, 13A, 14A rather than being displaced a distance D therefrom as for the embodiment of FIG. 1A. In this instance, therefore, a given rotation of primary support member 19A about its longitudinal axis causes a corresponding rotation of the panel assemblies 12A, 13A, 14A about first tilt axis 17A.

In this instance each panel assembly 12A, 13A, 11A is mounted for rotation about second tilt axis 18A comprising cross centre line 22A by means of a cross pivot bar 27 as perhaps beat seen in FIG. 4.3.

The end result of this construction is that the panel assemblies 12A, 13A, 14A can be tilted in unison about both first tilt axis 17A and second tilt axis 18A so as to achieve the orientations illustrated in FIGS. 1.1b through to FIG. 1.4b comprising respectively a horizontal position, a forward at 45° position, a forward and side 45° position and a side only at 45° position and/or positions in between.

The aim of the arrangements of both FIG. 1A and FIG. 1B is to provide first and second tilt axes for each and every one of the panel assemblies which is arranged to minimize mechanical tilt effort. This is achieved by placing the first tilt axes 17, 17A on a common first tilt axis which is aligned as close as practicable to the centre of mass of the array of the panel assemblies 12, 13, 14 and, to place second tilt axis 18 at or as near as practicable to the centre of mass of each of the panel assemblies 12, 13, 14.

In many instances, particularly where each panel assembly is of rectangular or square shape, the intersection of the longitudinal centre line 21 and cross centre line 22 of each panel assembly will be a good approximation to the centre of mass of the panel assembly for most practical purposes.

Considerations of centre of mass relate to the inherent mass of each panel assembly—the larger the mass, the greater the tilt effort that will be required and more so the further the tilt axis is away from alignment with the centre of mass.

Considerations of mass apply to all installations of the solar panel assemblies 10. 10A including stationary applications, mobile applications, terrestrial applications and space applications.

A further consideration which can be important where significant wind loadings are experienced in terrestrial applications relates to the centre of area of each panel assembly. The "centre of area" is also known as the "centre of pressure".

Where wind loading is a relevant consideration tilt effort can be minimized by seeking to align the common first tilt axis and/or second tilt axis with the centre of area or centre of pressure of each panel assembly.

In some situations it can be desirable to have positive feedback to the operator of the wind forces extended on the array.

In this situation the tilt axis can be displaced from the centre of pressure so as to provide to the operator an indication through the control mechanism of the degree of wind force being exerted.

Forms of interconnection between the individual panels by which all individual panels are tilted in unison will now be described with reference to specific examples.

Also, specific examples will be provided where each of the individual panels is profiled into other than a planar arrangement particularly, although not exclusively, with marine applications in mind.

First Detailed Preferred Embodiment

With reference to FIGS. 2.1–2.5 specific panel interconnection arrangements will now be described whereby all panels can be made to tilt in unison.

The apparatus described according to a first preferred embodiment consists of a gimbal-type system for a number of solar panels, as shown in FIG. 2.1 and FIG. 2.2. As shown, the panels 101 can all tilt together in sidewise direction on one single beam 102 swinging around pivots and bearing 103 which are supported in such a way as to allow at least +/−45 deg swing either side. In forward/back direction each panel has its own two pivot points 104 (FIG. 2.3) at the center of the support beams 106 under each solar panel. These pivot points engage in bearings which are mounted on two arms 105 which are attached to the support beam 102. Ideally the panels should have sufficient distance separating them, so they do not throw a shadow on the one behind, when the sun is low on the horizon and the vehicle is travelling towards or away from the sun. This arrangement with multiple panels mounted behind each other in longitudinal direction also reduces the wind drug resistance as compared to a single large panel which if tilted against the direction of travel would have a large frontal area.

In this embodiment the forward wind resistance is roughly equal only to that of a small single panel. A large total collection area can be obtained while maintaining small facial area by having a large number of small panels mounted behind each other on such a mechanism. The panels can be linked together in a number of ways so that they can be tilted together in synchronism or unison in forward/back direction In one form of this invention thin tilt cables 107 are employed, shown in FIG. 2.3, each passing through two pulleys 108, 109 and being attached to the front and back edges of the panels 101 by which the panel is tilted. These tilt cables are joined to the main draw cable 110. A handle 116 allows pulling on this draw cable in forward/back direction which will cause all the panels to tilt together in forward/back direction, and by putting pressure on this handle sidewise will cause the beam with all the panels to swing sidewise. This provides joystick-like control over the tilt alignment of the panels.

The method as described above, of using tilt cables is simple and relatively inexpensive, but it requires some way of adjusting the total length of each tilt cable, because this changes when panels are at different back-forward angles and there may be slack in the tilt cables at some positions if there was no way of tensing the tilt cables. One method can be by having the pulleys 109 not rigidly attached to the main beam, but have a freedom to move under tension of a spring 112. This way cables are without slack, while allowing positive movement in one or the other direction. Another method to remove the slack of the tilt cables is to have some resilient link, like a spring 113 in FIG. 2.4. on the end of each tilt cable. There are other ways, for example like using a small drum on each panel with a torsion spring which takes up an excess length of the tilt cables at different orientations. Typically tilt angles of up to +/−45 deg can be achieved with this method of using tilt cables.

Another of the methods proposed to tilt the panels in forward/back direction is to utilize arc-segments 114 on each panel, as shown in FIG. 2.5. These arc-segments are mounted on a middle supporting beam 115 under each of the solar panels and are joined by a thin flexible draw cable 110 by which the panels can be tilted all together. This cable is taken around the arc segments in the following way. The arc-segment has two grooves around its main outer edge and each side of the cable is located in one of the grooves and both are secured at the top of the segment. This way both ends of the draw cable do not cross each other and the arc-segment is free to swing around the pivot points 104. Typically the tilt angles of +/−60 deg or more can be achieved with the arc-segment method. This method has no problem like the one above, because there is no slack in the cable at any positions of the panels.

There can be other mechanical linkages or other non-mechanical methods which can be used to link the panels together, like pneumatic, hydraulic, or servo systems. The above two examples were selected as representative and were used to actually demonstrate the practicality of this proposal. One can also use another means of achieving synchronous tilting of the panels in a sidewise direction. One can also have multiple assemblies of such arrays next to each other for large total collection areas, linked either to mechanically or by other means. Sufficient separation between these is necessary to avoid shadow of one array on the other at low altitudes of the sun. One can employ also a full servo system to track the sun automatically. Manual methods prove to be inexpensive and effective and do not require any source of power.

A simple locking mechanism can be provided in both directions of tilt. This may be desirable in gusty wind conditions. One of the methods which can be used to lock the tilting of the main beam is a slotted arc-segment mounted on one of the supporting columns of the pivot/bearing 103. An engaging pin on a lever which is pushed against the slotted arc-segment by a spring holds it locked in the selected position. There can be other methods of locking the main beam at selected tilt, like a spring loaded friction pad against a plain arc-segment at the bearing 103, which will have a finer position setting then a slotted arc-segment. For locking the forward/back tilt, the handle 116 by which main draw wire is pulled can also have some release mechanism by which it locks its position against the main beam. This way the rider has no need to hold the panels all the time at a specific angle by hand. He can press the lever at the bearing 103 and tilt the whole beam with all the panels sidewise and then release the lever at the desired location.

For forward/back tilt the rider presses the release mechanism on the handle 116 and then slides it forward/back until the panels are in the correct position then lets go of the release mechanism. It would be possible also to have one release mechanism activating both side and forward/back tilt, so that simplicity of a joystick-like movement is retained while the panels locked in position when the release mechanism is let go.

In the embodiments described this far, the first and second tilt axis arrangement with the axes placed at right angles can be thought of as a form of gimbal mechanism. A property of the gimbal system descried thus far is, that the composite tilt in both directions against sunlight somewhere between forward and side direction, as a result of a combined forward/back and side tilt, is even greater then the maximum tilt in each of the directions, roughly being equal to 1.5 times the maximum tilt in one of the axes. Therefore the average alignment capability is a little better than the limit in each of the directions.

A preferred exemplary installation employs six standard 80W panels each weighing 7 kg, mounted on a support beam of total length of 4 meters. This installation allows fast manual tracking of the sun and thus maximum solar energy collection without any delay. Because the panels are all pivoting in the plane close to where their center of mass/gravity is, then all of the system is relatively balanced and no excessive force is required to tilt. In the abovementioned prototype, although the total weight of there 6 panels is 42 kg, it has been found mechanically easy to tilt these panels in all directions with one hand.

Second Detailed Preferred Embodiment

With reference to FIGS. 4.1–4.5 there are illustrated details of a further manner of interconnection or the panels of FIG. 1B whereby all panels tilt in unison.

This embodiment relates to a mechanical apparatus for two directional tilting (in forward/back and sidewise directions) of solar panels to allow full alignment of the panels towards the sun on a moving or stationary installation, which utilize solar power. This design is also suitable for combined utilisation of solar and wind energy, with panels in the chaps of wings.

In this design the solar panels are mounted in such a way that forces required to align these are minimal due to the pivot points around which the panels rotate being at the center of mass of the panels, as shown in FIGS. 4.1, 4.2, 4.3. This is realised, in this particular design, due to the main feature, that each panel is in the form of two half panels/wings. These solar panels/wings 301a and 301b are mounted by a shaft 304 which is secured within the wings. This shaft is situated in bearings 319 (FIG. 4.3) which are a part of the main beam 302. Here the main beam 302 which carries typically three or more pairs of wings 301a and 301b, each forming a panel assembly, is supported on two support frames 303 which allow the beam to rotate around its longitudinal axis by bearings 305 on each support frame This mechanism allows almost full +−90 degrees sideways rotation from horizontal. In addition each pair of the solar panels/wings is also able to rotate freely almost a full +−90 degrees in the forward/back direction. This way the maximum use of the solar energy can be made. FIG. 4.1 shows the solar panels/wings in the horizontal position when the sun is right above and FIG. 4.2 shows the solar panels/wings at a composite angle facing both forward and to the left side.

The forward/back direction of tilt of each wing pair needs to be linked together by a linking mechanism. This can be mounted, for example, within the hollow, tube like beam 302. This mechanism can be, for example, either a chain and a sprocket mechanism, or a shaft with bevel gears or, as in the example shown in FIG. 4.3, a continuous thin flexible cable 310 and pulleys 317 on each shaft 304 around which the cable is wound in a single turn and secured by a screw. A single joystick-like lever 318 is attached to the shaft 304 at one of the pairs of wings, closest to the reach of the pilot, and is used to manually tilt these solar panels/wings in all the directions, as shown in the FIG. 4.1 and FIG. 42. Alternatively an automatic motorized alignment system can be used on larger vessels. A small craft with such a system of solar panels is shown in FIG. 4.1.

A variation of the design suitable for larger sailing craft, either of single or mono hull design can have (instead of the supporting frames 303) two main posts telescopically retractable, so that in extreme wind conditions where aligning the solar panels/wings horizontally is not be sufficient to reduce windage, then the solar panels/wings are lowered onto the deck of the craft.

This way they can still function as solar collectors with somewhat reduced efficiency, because they are horizontal. It would be also possible to make the solar panels/wings easily removable, for safe storage or for transportation.

For ground installations, like on solar farms, it may be of an advantage for the beam 312 in FIG. 4.4 not to be horizontal. It maybe aligned in north—south direction and inclined from horizontal at an angle, best suited to the avarage noon position of the sun through the year. This is given by the specific geographical latitude location of the installation. This way a minimum tilt would be required to track the sun in forward/back direction and also panels can have minimum separation between them along the beam. FIG. 4.4 shows the example of a ground instalation with commercially available solar panels. FIG. 4.5 shows the example of the drive mechanism which links the panels to provide alignment in the forward/back direction. In this case a chain 306 is used and sprocket wheels 307 on each shaft 304 couples the movement of the solar panels The beam 312 which carries the panels, in this case, is pivoted at ends, on bearings 315 which are supported on the frame 313. Automatic tracking is implemented by a sensor detecting the relative position of the sun to the panels and two motorised drive systems 320 and 321 which rotate the panels in both forward/back and sidewise directions until the sensor detects perfect alignment. At typical solar farm can consist of a number of such modules, at correct spacing, so that at no time would one module cast a shadow onto another module.

Third Detailed Preferred Embodiment

With reference to FIGS. 3.1–3.5 a further interconnected arrangement of panels is described wherein the panels are profiled in other than a planar arrangement. In this instance the panels are profiled to form solar wings which in addition to harnessing solar energy, are also arranged, by virtue of their profile, to harness wind energy, The mechanism of FIGS. 2.1–2.3 is used in the present embodiment to support an array of wings with solar panels on their outer surface. Desirable tilt capability for this dual utilization of solar and wind energy is at least +/−60 deg in all directions, which is achieved by using an arc segment for the tilting mechanism as shown in FIG. 2.5. This mechanism allows one not only to align the wings/solar panels towards the sun for optimum solar energy collection, but it will also allows one to align the wings/solar panels relative to the direction of wind so that wind energy can be utilized as well. An example of extreme situations would be:—on a cloudy windy day only wind would be utilized and on a sunny day with no wind only solar energy would be utilized. Any other situation would present the possibility of being able to choose which of wind or solar energy is to contribute most to the speed of the craft, or what combination of both may be most desirable, since both sources of energy can be utilized at the same time. An example is running before the wind while the sun is also ahead and low on the horizon (see FIG. 3.1 and FIG. 3.2) The arrangement also allows reducing the effect of wind in some situations, for example when sailing into the wind by presenting the panels/wings with their minimum edge area into the wind by aligning them horizontally and utilizing the solar energy only, as if the sun is on one side, or straight above.

In this example the wings/panels are mounted in a straight line behind each other. For wind utilization it has benefits of not having a one large sail area but having a number of small sails. One large area would necessitate lifting the center of the effort of the sail higher then with having a number of small sails, on the same level, one behind the other. This results in reducing the tipping moment when the wind force is from the side, contributing to a more stable craft. FIG. 3.3 shows that also by reducing the side angle of the wing, from being almost vertical to almost horizontal will reduce the turning moment, by converting some of the resulting force due to wind into a lifting force which will do much less harm. In effect this will be lifting the boat slightly out of the water When wind is on the side, resulting force can be resolved into three components as shown in FIG. 3.4 and FIG. 3.5. FIG. 3.5 shows the apparent cross section of the wing due to the composite angles of tilt in forward direction and sidewise direction. This is a very efficient angle for sailing with wind on the beam of the boat. Efficiency of sailing crafts is also improved with having a number of sails, where gaps between the sails play a significant role. Aesthetic appearance of such a craft is also not a deterrent, because it resembles an old fashioned square rigged craft with a number of square sails behind each other, which has a certain majesty in its appearance. Additional benefit, which is common to most sailing craft with solid wings is that they can be reversed so that boat is caused too ecelerate rathern than accelerate.

In this example tilting of wings is around the pivot points which are mounted roughly in the center of the area of the wings (FIG. 3.3) and therefor the force due to the wind is roughly balanced, equal force acting on both top and bottom part of the wing area facing the wind and therefor only a relatively small force is required to adjust the relative position of the wing under the influence of wind. Since the weight of the panel is also balanced around the pivot points, then only a little force is required to tilt and align the complete system. This provides a simple and fast way of aligning these wings by hand to any orientation for utilizing whatever energy the rider of this craft wishes to utilize.

A simple locking device mechanism can be provided in both directions of the tilt. This may be desirable in gusty wind conditions. One of the methods which can be used to lock the tilting of the main beam, is a slotted arc-segment mounted on one of the supporting columns of the pivot/ bearing 203. An engaging pin on a lower lever which is pushed against the slotted arc-segment by a spring holds it locked in the selected position. There may be other methods of locking the main beam at selected tilt, for example spring loaded friction pad against plain arc-segment at the bearing 203, which would have finer position setting than the slotted arc-segment. For locking the forward/back tilt, the handle 216 by which the main draw wire is pulled can have also a release mechanism by which it locks its position against the main beam. This way the rider has no need to hold the panels all the time at a specific angle by hand. He can either press the lever at the bearing 203 and tilt the whole beam with all the panels sidewise and then release the lever at the desired location. For forward/back tilt the rider presses the release mechanism the handle 116 and then slides it forward/back until the panels are in the correct position then lets go of the release mechanism. It is possible also to have one release mechanism activating both side and forward/back tilt, so that the simplicity of a joystick-like movement can be retained and whereby the panels are locked in position when release mechanism is let go.

Fast release of the wings position and alignment with small force required in also important from the safety point of view. The rider can quickly manually align the panels to reduce the force of wind on them, or to face them in such a way so that only the side edge of the wing with minimum area is facing into the wind. If this gets too strong only solar power is utilized for propulsion.

It is to be understood that the panel shape of this embodiment can be modified to better harness wind an well as solar energy. In one particular form, the panels can be made in the wing shapes described in the second embodiment. This arrangement is mechanically simpler than for the first embodiment.

Summary

Embodiments of the invention described thus far, broadly speaking, comprise panel assemblies mounted in an array and in association with a tilt mechanism whereby each and every panel assembly can be tilted in unison about both a first tilt axis and a second tilt axis. In the examples given the tilt axes are at right angles to each other.

In the case of terrestrial, mobile applications such as may be employed for sailing craft each panel assembly and the array of which it forms a part are mounted in a substantially horizontal orientation which can be thought of as a form of equilibrium position and from which each of the panel assemblies can be tilted about either its first or second tilt axis.

In the examples the arrangement is such that mechanical effort required to tilt each panel assembly about either its first or second tilt axis is minimized by selecting an appropriate alignment of the tilt axis with respect to each panel assembly and the entire array. In particular forms the tilt axes are positioned as closely as practicable whereby the centre of mass and/or centre of pressure of the array is along or near the common first axis and centre of mass and/or centre of pressure of each panel assembly is along or near the second tilt axis of each panel assembly.

In the examples described the silt axes are arranged at right angles to each other. In particular examples the first tilt axis is aligned with the direction of travel of the craft or vehicle to which the array of panel assemblies is attached. In the case of stationary, terrestrial installations the first tilt axis can be aligned so that it lies in the plane of a north/south orientation and, in a further particular example, at an angle from the vertical corresponding to the latitude of the location of installation.

Industrial Application

The panel assemblies and their associated tilt mechanisms are particularly suited to applications which require the panel assemblies to be adjusted in their orientation during use as for example when seeking to track the sun and/or harness wind power. Particular examples include use on sailing craft to harness solar and/or wind power.

What is claimed is:

1. A solar panel apparatus, comprising:

an array of solar panel assemblies wherein the panels of said panel assemblies define a wing shape so as to harness wind energy;

a solar panel tilt mechanism adapted to take account of solar and wind conditions and further adapted to tilt in unison all panel assemblies forming said array of solar panels assemblies, said tilt mechanism incorporating individual panel tilt supports associated with each individual panel assembly of said array of panels, said individual tilt supports supporting each said individual panel assembly with which it is associated about at least a first tilt axis, all of said first tilt axes aligned along a common first tilt axis, said common first tilt axis aligned whereby the center of mass of the array of solar panel assemblies lies substantially along said common first tilt axis, whereby effort required to tilt said array about said common first tilt axis is reduced.

2. A solar panel tilt mechanism for an array of solar panel assemblies wherein the mechanism is adapted to take account of solar and wind conditions and is further adapted to tilt in unison all of the solar panel assemblies forming the array of solar panel assemblies wherein the tilt mechanism incorporates individual panel tilt supports associated with each individual panel assembly of the array of panel assemblies wherein the individual tilt supports supporting each of the individual panel assemblies with which it is associated about at least a first tilt axis and wherein all of the first tilt axes are aligned along a common tilt axis and wherein the common first tilt axis is aligned such that a center of pressure of the array of solar panel assemblies lies substantially along common first tilt axis such that effort required under incident wind load to tilt the array about the common first tilt axis is reduced and wherein the panels of the panel assemblies define a wing shape so as to harness wind energy.

* * * * *

UNITED STATES PATENT AND TRADEMARK OFFICE
CERTIFICATE OF CORRECTION

PATENT NO. : 6,848,442 B2
DATED : February 1, 2005
INVENTOR(S) : Michael B. Haber It is certified that error appears in the above-identified patent and that said Letters Patent is hereby corrected as shown below:

Column 1,
Line 12, after "panels" add -- . --.

Column 2,
Line 31, after "axis" add -- . --.
Line 34, delete "hereby" and insert -- whereby --.
Line 58, after "invention" delete ":" and insert -- ; --.

Column 3,
Line 8, after "an" delete "15".
Line 47, after "panel" delete "is" and insert -- 15 --.
Line 52, after "manner" delete ";".
Line 54, delete "19" and insert -- 18 --.

Column 4,
Line 8, delete "18a" and insert -- 18 --.
Line 33, delete "11A" and insert -- 14A --.
Line 36, delete "beat" and insert -- best --.
Line 65, after "assemblies" delete "10." and insert -- 10, --.

Column 5,
Line 46, delete "drug" and insert -- drag --.

Column 6,
Line 41, after "either" delete "to".

Column 7,
Line 26, delete "there" and insert -- these --.
Line 32, delete "or" and insert -- of --.
Line 41, delete "chaps" and insert -- shape --.

Column 8,
Line 8, delete "FIG. 42" and insert -- FIG. 4.2 --.
Line 28, delete "avarage" and insert -- average --.
Line 55, after "energy" delete "," and insert -- . --.

UNITED STATES PATENT AND TRADEMARK OFFICE
CERTIFICATE OF CORRECTION

PATENT NO. : 6,848,442 B2
DATED : February 1, 2005
INVENTOR(S) : Michael B. Haber It is certified that error appears in the above-identified patent and that said Letters Patent is hereby corrected as shown below:

Column 9,
Line 8, after "3.2)" add -- . --.
Line 27, after "water" add -- . --.
Line 41, delete "too ecelerate" and insert -- to decelerate --; delete "rathern" and insert -- rather --.

Column 10,
Line 15, delete "in" and insert -- is --.
Line 22, delete "an" and insert -- as --.
Line 53, delete "silt" and insert -- tilt --.

Signed and Sealed this

Twenty-eighth Day of March, 2006

JON W. DUDAS
*Director of the United States Patent and Trademark Office*